United States Patent [19]

Abo et al.

[11] 4,341,071
[45] Jul. 27, 1982

[54] FUEL CONTROL SYSTEM FOR A GAS TURBINE

[75] Inventors: Toshimi Abo; Hidetoshi Kanegae, both of Yokohama, Japan

[73] Assignee: Nissan Motor Company, Limited, Kanagawa, Japan

[21] Appl. No.: 154,050

[22] Filed: May 28, 1980

[30] Foreign Application Priority Data

Jun. 1, 1979 [JP] Japan .................................. 54-68313

[51] Int. Cl.³ .............................................. F02C 9/26
[52] U.S. Cl. ............................ 60/39.14 R; 60/39.28 R
[58] Field of Search ..................... 60/39.14 R, 39.28 R

[56] References Cited

U.S. PATENT DOCUMENTS

| | | | |
|---|---|---|---|
| 3,151,450 | 10/1964 | Blackaby | 60/39.14 R |
| 3,520,133 | 7/1970 | Loft et al. | 60/39.14 R |
| 3,902,315 | 9/1975 | Martin | 60/39.14 R |
| 3,938,320 | 2/1976 | Nelson | 60/39.14 R |
| 3,991,558 | 11/1976 | Schroff | 60/39.14 R |
| 4,274,255 | 6/1981 | Pollak | 60/39.14 R |

*Primary Examiner*—Robert E. Garrett
*Attorney, Agent, or Firm*—Lowe, King, Price & Becker

[57] ABSTRACT

A gas turbine control system with a control signal generator for a two-shaft gas turbine having a compressor turbine and a power turbine. The gas turbine control system comprises, in combination, a control signal generator for outputting signals for giving optimum fuel supply rates to the fuel control valve in accordance with gas generator shaft speeds of the compressor turbine until the power turbine speed approaches a target power turbine speed, so that the turbine system can be controlled under direct control conditions, a comparator for outputting a signal to switch the system from direct control to feedback control when the signal level under the feedback control becomes smaller than that under the direct control, and a selector for selecting one of the above-mentioned two control conditions, in addition to a conventional feedback control system having a power turbine differential speed detector and an calculation unit.

7 Claims, 5 Drawing Figures

FUEL CONTROL SYSTEM FOR A GAS TURBINE

BACKGROUND OF THE INVENTION

1. Field of the Invention

The present invention relates generally to a fuel control system for a gas turbine, and more particularly to a fuel control system for a two-shaft gas turbine operated with a power (or free) turbine, by which fuel supply rates can be controlled efficiently, especially when the turbine is started, in order to accelerate the turbine stably and rapidly to a target speed.

2. Description of the Prior Art

The background of the present invention will be explained hereinbelow with respect to the control of the speed of rotation of a power turbine of a gas turbine.

As is well known, conventionally, closed-loop control (or feedback control) systems which control the amount of fuel supplied in a feedback manner have been used for maintaining the power gas turbine at a predetermined target speed. In this case, the fuel supply rates have mainly been controlled in the steady state of operation of the power turbine.

Basically, however, when a gas turbine is started, since the difference between the actual speed of the power turbine and the target steady-state speed is too great, it is impossible to control the fuel rates supplied to the gas turbine by a simple method such as closed-loop proportional control or closed-loop proportion-integration combination control, which would result in an excessive fuel supply.

In other words, when a gas turbine is started, the optimum air/fuel ratio, that is, the optimum ratio of the amount of fuel to the amount of air which corresponds to the compressor turbine speed when driven by a starter motor, must be provided to the gas turbine. For the abovementioned reason, it is not desirable to control the fuel rates by a simple feedback system detecting only the power turbine speed, especially when the engine is being started.

Therefore, another control method which has been used is such than an optimum amount of fuel which produces an optimum ignition air-fuel ratio for starting is predetermined based on experience and upon starting the gas turbine the predetermined amount of fuel is supplied and after the power turbine speed has reached a predetermined speed, closed-loop control is started. In this case, however, since it is necessary to wait until the power turbine speed reaches a predetermined speed while supplying the predetermined amount of fuel which produces an optimum air/fuel ratio for starting, it takes a long time for the power turbine to reach the predetermined speed; that is, engine starting requires considerable time.

Therefore, there has been a strong need for a gas turbine the starting time of which is shorter, especially when the gas turbine is used with an electric generator for emergency use.

BRIEF SUMMARY OF THE INVENTION

With these problems in mind, therefore, it is the primary object of the present invention to provide a fuel control system for a gas turbine which can reduce the starting time of the power turbine, that is, which can accelerate the power turbine speed to a target speed stably and quickly whenever the turbine is started.

It is another object of the present invention to provide a fuel control system for a gas turbine in which the fuel supply rate is controlled in accordance with the revolution speed of the gas generator shaft (or the compressor turbine) under feed forward control, so that a stable acceleration performance can be obtained efficiently on the gas generator side when the turbine is started.

It is a further object of the present invention to provide a fuel control system for a gas turbine in which the system is controlled under direct or feed forward control immediately after the turbine is started, and then under closed-loop or feedback control after the turbine is accelerated to approximately the steady state.

In order to achieve the above-mentioned objects, the fuel control system for a gas turbine of the present invention comprises a control signal generator outputting a signal giving the optimum fuel supply rates to the fuel control valve when the gas turbine is started, in addition to a conventional closed-loop control system. The control signal generator outputs control signals for providing the optimum fuel supply rates as a function of gas generator shaft speed of the compressor turbine. The control signal generator is constructed such that it produces control signals to let the fuel control valve supply the predetermined amount of fuel in accordance with the compressor turbine speed. Being called feed forward control, the fuel control system of the present invention controls the amount of fuel supplied to a gas turbine by using the signals output from the control signal generator until the power turbine speed reaches approximately the target steady-state speed, thereafter the gas turbine is controlled under closed-loop control as in a conventional system.

BRIEF DESCRIPTION OF THE DRAWINGS

The features and advantages of a fuel control system for a gas turbine according to the present invention over a prior-art fuel control system will be more clearly appreciated from the following description taken in conjunction with the accompanying drawings in which.

DETAILED DESCRIPTION OF THE PREFERRED EMBODIMENT

Figure 1:
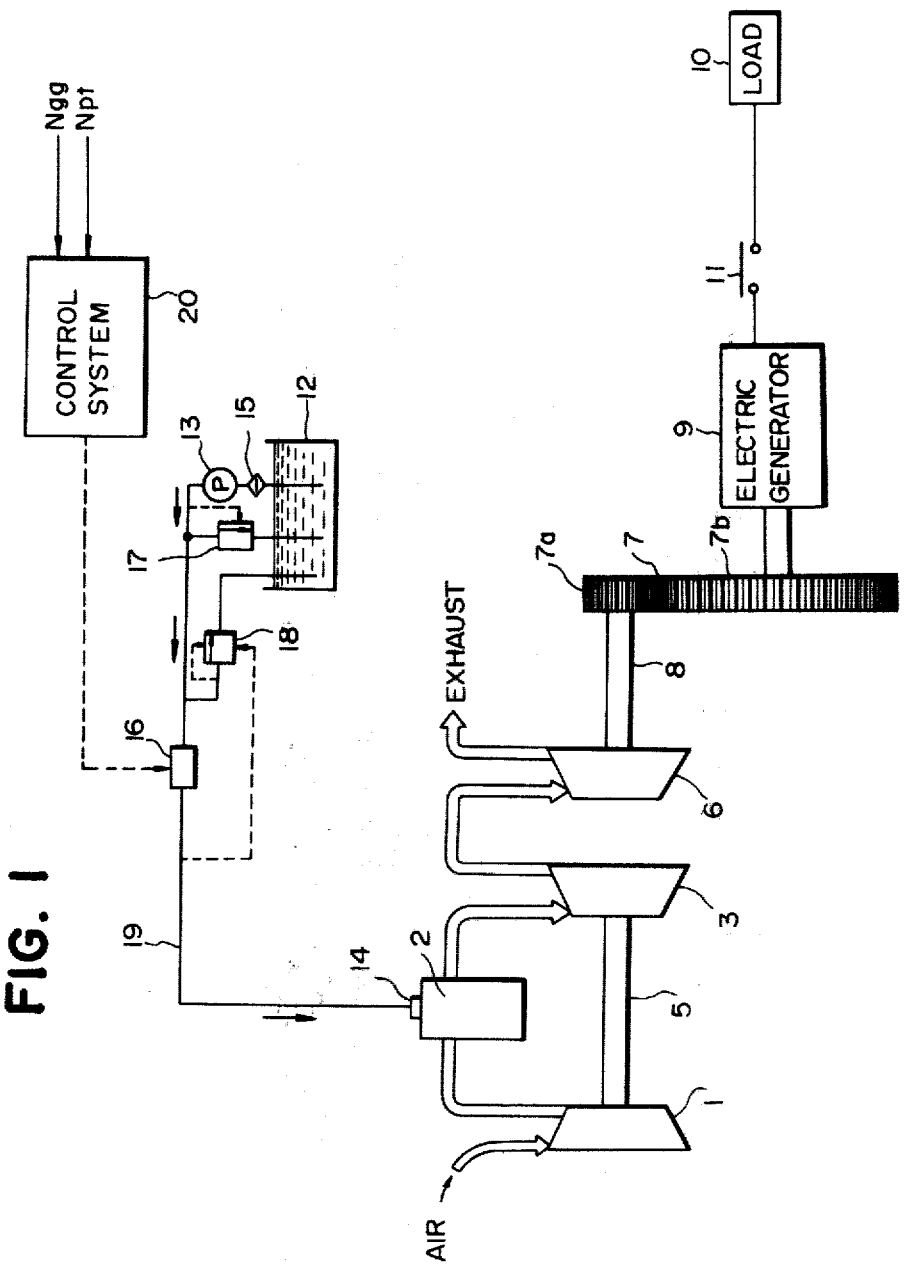
FIG. 1 is a schematic diagrammatical view of a gas turbine system.

As shown in FIG. 1, a typical gas turbine engine comprises a compressor 1 to compress the air being fed into a combustion chamber 2, a compressor turbine 3 to which the heated high temperature air is fed to drive the compressor 1, a gas generator shaft 5 connecting the compressor 1 to the compressor turbine 3, and a power turbine 6 to which the heated high temperature air generated from the combustion chamber 2 is fed after having passed through the compressor turbine 3.

The output of the power turbine 6 is applied through a power turbine shaft 8 to a reduction device 7 composed of two gears 7a and 7b to rotate an electric generator 9. The generator 9 is connected to a load 10 such as a motor through a switch 11 where necessary.

The fuel for the gas turbine system is stored in a fuel tank 12, and supplied by a pump 13 to an injection valve 14 first through a filter 15 and next through a fuel control valve 16. In this fuel control system are also provided a relief valve 17 and a pressure difference adjusting valve 18. The relief valve 17 is used to send back excess fuel to the fuel tank 12 in accordance with a pressure signal (shown by dotted lines in FIG. 1) when the fuel pressure rises above a predetermined value. The pressure difference adjusting valve 18 is used to return surplus fuel to the fuel tank 12 when the pressure difference across the fuel control valve 16 (shown by dotted lines in FIG. 1) rises above a predetermined value, in order to stabilize the operation of the fuel control valve 16. The fuel passage from the filter 15, through the pump 13 and the fuel control valve 16, to the injection valve 14 is called the main fuel path 19. In the fuel control system for a gas turbine explained above, a fuel control system 20 is usually provided to control the fuel control valve 16 electrically; that is, in order to control the gas turbine stably and efficiently according to gas generator shaft speed $N_{gg}$ and power turbine shaft speed $N_{pt}$. In this case, the control valve 16 is so designed as to open or close the main fuel path 19 in accordance with electric signals sent from the control system 20.

Figure 2:
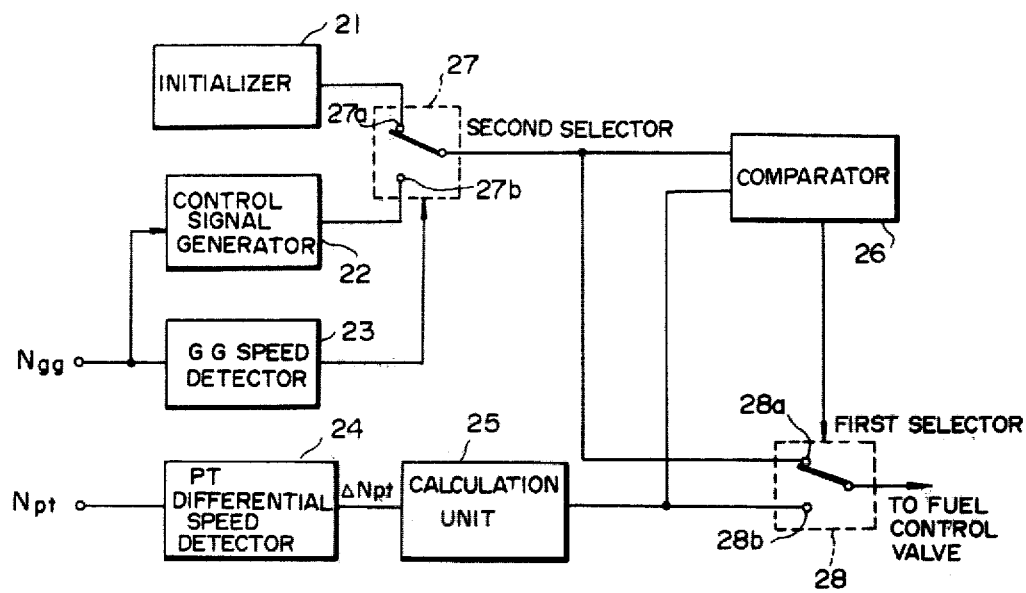
FIG. 2 is a schematic block diagram of a fuel control system embodying the present invention.

The fuel control system is now explained in more detail with reference to FIG. 2.

The fuel control system of the present invention comprises an initializer 21 to output a signal for giving a constant optimum fuel supply rate to the control valve 16 when the gas turbine is started, a control signal generator 22 to output signals for supplying an optimum fuel supply rate to the fuel control valve 16 in accordance with the gas generator shaft speed (on the compressor turbine side) after the gas generator shaft shaft speed reaches a predetermined initial value, a gas generator shaft speed detector 23 to determine the gas generator shaft speeds and to output a signal to switch a selector 27 from the signal from the initializer 21 to the signal from the control signal generator 22 when the gas generator shaft speed reaches a predetermined initial value, a power turbine differential speed detector 24 to detect the actual power turbine speed and to output a differential speed signal ($\Delta N_{pt}$) which represents the difference between the actual speed $N_{pt}$ and a predetermined target speed $N_{ptset}$ of the power turbine shaft, a calculation unit 25 to output a signal for giving an appropriate fuel supply rate to the fuel control valve after executing arithmetic operations in accordance with the differential speed signal supplied by the power turbine differential speed detector 24, a comparator 26 to compare the signal from the initializer 21 or the function generator 22 with the signal from the calculation unit 25 and to output a signal to another selector 28 when the signal from the calculation unit 25 is smaller than that from the initializer 21 or the function generator 22, the first selector 28 switching from the signal from the initializer 21 or the control signal generator 22 to that from the calculation unit 25 when the comparator 26 outputs a corresponding signal, and a second selector 27 to switch from the signal from the initializer 21 to the signal from the control signal generator 22 when the gas generator shaft speed detector 23 outputs a signal thereto. The signal compared in the comparator 26 is proportional to the speed difference signal which represents the difference between the actual power turbine speed and the target power turbine speed.

The connections of the control system are as follows:

The initializer 21 and the control signal generator 22 are both connected to the second selector 27, the output of which is connected to the comparator 26 and to the first selector 28. The power turbine differential speed detector 24 is connected to the first selector 28 and the comparator 26 through the calculation unit 25. The output of the first selector 28 is connected to the fuel control valve 16. In addition, a digital signal indicating gas generator shaft speed $N_{gg}$ is input to the control signal generator 23, and a digital signal indicating power turbine shaft speed $N_{pt}$ is input to the power turbine differential speed detector 24.

Next, the operation of the control system is described.

Figure 4:
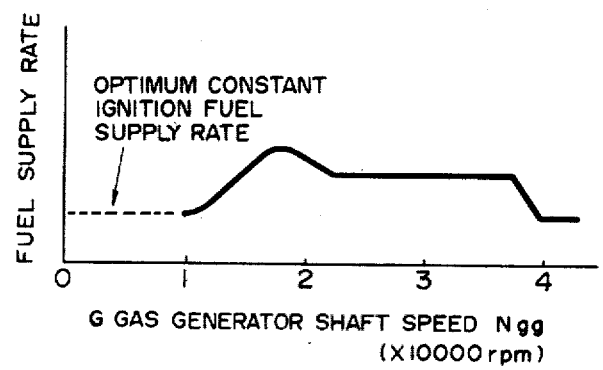
FIG. 4 is a characteristic graph showing the fuel supply rate as a function of the gas generator shaft speed.

When the starter and ignition of the gas turbine are both turned on, since the second selector 27 is first set to a contact 27a and the first selector 28 is set to a contact 28a, a signal from the initializer 21 is supplied to the comparator 26 and the fuel control valve 16 through the second selector 28. Therefore, fuel at a rate according to the signal from the initializer 21 is supplied to the combustion chamber 2 through the injection valve 14 to rotate the compressor turbine 3 and the power turbine 6. Under these conditions, when the gas generator shaft speed $N_{gg}$ reaches a predetermined speed $N_0$, that is, when the gas turbine begins to operate by itself without the assistance of the starter motor, the gas generator shaft speed detector 23 outputs a signal to the second selector 27 to switch the selector 27 from the contact 27a to a contact 27b, and thus the first ignition period ends. As a result, the function generator 22 is now connected to the fuel control valve 16 through both the selectors 27 and 28. This indicates the start of the second ignition period. Since the control signal generator 22 includes a stored function to give an optimum fuel supply rate according to the gas generator shaft speed $N_{gg}$ (compressor turbine side), for example, as depicted in FIG. 4, the power turbine 6 is controlled in accordance with this function. Since the relation between the fuel supply rate and the gas generator shaft speed is fixedly determined in accordance with the function, this is termed direct or feed forward control, as opposed to feedback control.

Although in this case the gas generator shaft speed $N_{gg}$ is used to determine the starting point of the second ignition period, it is also possible to detect the gas temperature in the combustion chamber 2 for this purpose.

When the power turbine speed further rises to approximately a steady-state target value, comparing the signal fed from the function generator 22 with the signal fed from the calculation unit 25, the comparator 26 switches the first selector 28 from the contact 28a to a contact 28b to feed the signal from the calculation unit 25 to the fuel control valve 16.

In more detail, a predetermined target power turbine speed $N_{ptset}$ is stored in the power turbine differential speed detector 24, and the turbine differential speed detector 24 always detects the actual power turbine speed $N_{pt}$, calculates the difference between $N_{pt}$ and $N_{ptset}$, and outputs the differential signal $\Delta N_{pt}$.

The calculation unit 25 calculates a signal to give an appropriate fuel supply rate in accordance with this $\Delta N_{pt}$. Since the fuel supply rate for the turbine is determined by detecting the power turbine speed directly, this control method is called feedback or closed-loop control. Therefore, the power turbine speed detector 24 and the calculation unit 25 generate a signal so as to decrease the fuel supply rate when the actual turbine speed $N_{pt}$ is greater than the target speed $N_{ptset}$ or to increase the fuel supply rate when $N_{pt}$ is smaller than $N_{ptset}$, thus controlling the turbine speed in accordance with the difference between $N_{pt}$ and $N_{ptset}$.

When the turbine is started, the fuel supply signals from the calculation unit 25 are of course large, as compared with those from the initializer 21 or the function generator 22 because there is a great difference between $N_{pt}$ and $N_{ptset}$. Therefore, the turbine is controlled by the signals from the initializer 21 or the function generator 22. However, when the power turbine speed approaches a predetermined target speed $N_{ptset}$, the signal from the calculation unit 25 becomes less than that from the initializer 21 or the control signal generator 22. The comparator 26 compares both signal levels, and switches the signal from the initializer 21 or the function generator 22 to the signal from the calculation unit 25 when the signal from the calculation unit 25 becomes smaller than that from the initializer 21 or the control signal generator 22. Thereafter, the system is controlled under closed-loop conditions only by using the signals from the calculation unit 25.

Figure 3:
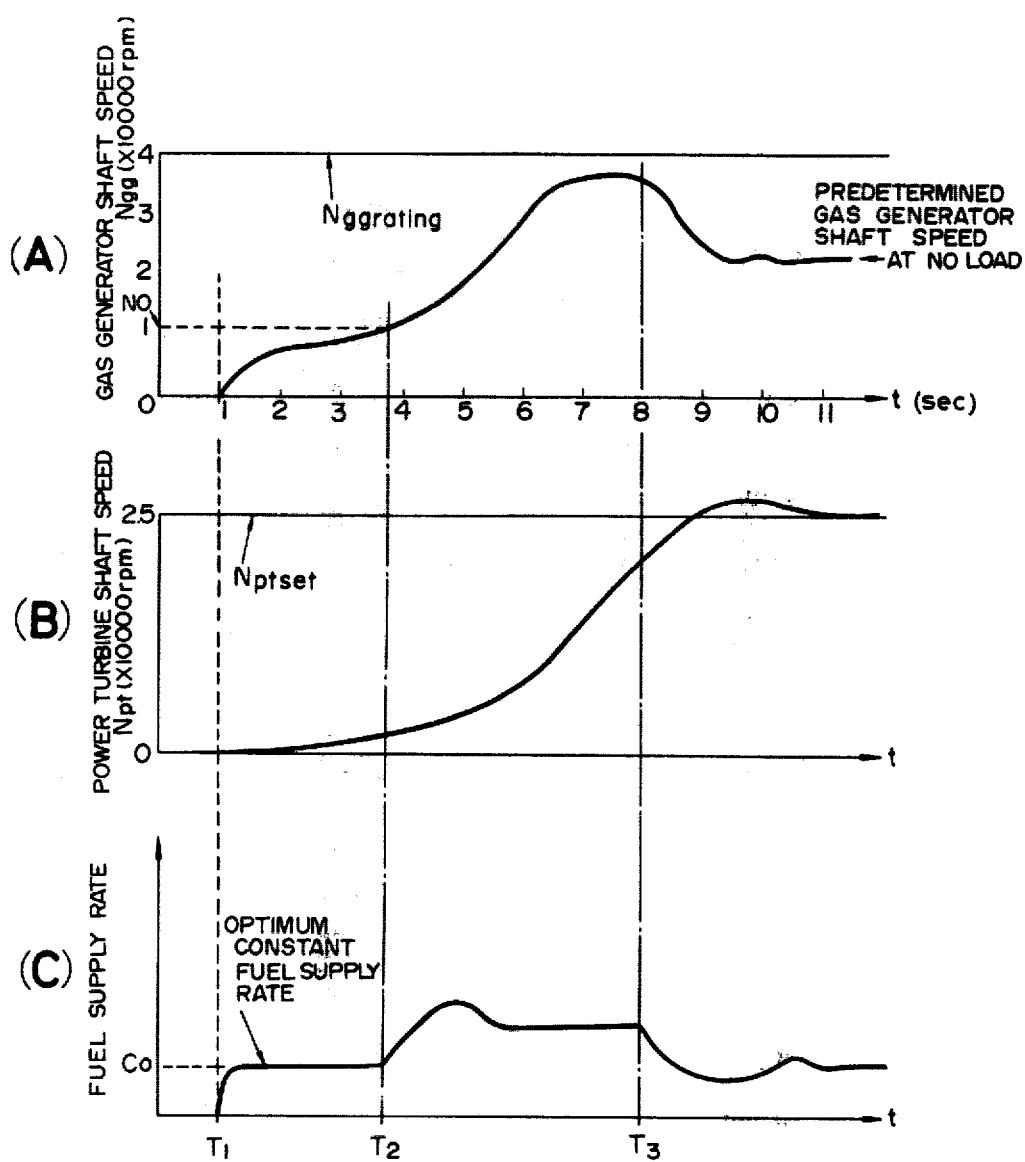
FIG. 3 is a set of timing charts showing the relations between the gas generator shaft speed, the power turbine speed, and the fuel supply rate.

By referring to the timing charts in FIG. 3, the operation is described from the standpoint of time sequence. In FIG. 3, (A) shows changes in gas generator shaft speed $N_{gg}$ with respect to time (sec), (B) shows changes in power turbine speed $N_{pt}$, and (C) shows changes in fuel supply rate. In these three time charts, $T_1$ denotes the start of the first ignition period, $T_2$ denotes the start of the second ignition period, that is, the direct control, and $T_3$ denotes the start of the steady-state control, that is, the feedback control.

As depicted in FIG. 3, when the gas turbine is started (at $T_1$), a signal for giving a constant optimum ignition fuel supply rate $C_0$ is applied to the fuel control valve 16 from the initializer 21. Therefore, the gas generator shaft speed $N_{gg}$ first increases, as shown in FIG. 3 (A), and next the power turbine speed $N_{pt}$ also gradually increases, as shown in FIG. 3 (B), following $N_{gg}$ with some delay. Thereafter, when $N_{gg}$ reaches a predetermined value $N_0$, the gas generator speed detector 23 outputs a signal to the second selector 27 to switch from the signal from the initializer 21 to the signal from the control signal generator 22. Therefore, the turbine system is controlled by the signals from the control signal generator 22 instead of the signal from the initializer 21.

The control signal generator 22 outputs signal for giving the optimum ignition fuel supply rate as a fixed function of the gas generator shaft speed. An example embodiment of this function is shown by solid lines in FIG. 4. In this figure, the broken line shows a constant optimum ignition fuel supply rate. Since this constant fuel rate is output from the function generator 22, it could be considered that the initializer 21 is not necessary. However, if the additional initializer 21 is provided for the control system, it is possible to preset various constant optimum ignition fuel supply rates in the initializer 21 varying according to the load.

With reference to FIG. 4, the fuel supply rate is first increased abruptly until the gas generator shaft speed $N_{gg}$ reaches a speed of some 20,000 rpm as long as there is no surging of the turbine (fluctuations in turbine speed), in order to accelerate the turbine efficiently, and next is decreased so that the power turbine speed $N_{pt}$ is not increased excessively beyond a rated speed $N_{ptset}$.

Further, if the gas generator shaft speed $N_{gg}$ approaches, for example, a rating speed of 40,000 rpm, the fuel supply rate is further reduced even if the power turbine speed has not yet risen to a target speed for some reason or other.

Although in principle the control signal generator 22 can be composed of analog circuits, in fact, digital circuits are used. In this case, the control characteristics are approximated by fitting straight line segments to the curve of FIG. 4. If digital circuits are used for the control signal generator 22, representative points on the characteristic curve are selected and stored in a read-only-memory (ROM) provided in the control signal generator 22, and then read out according to the gas generator shaft speed $N_{gg}$, for example, by table lookup. In control by the control signal generator 22 there is no feedback from the speed of the power turbine shaft. With this so-called direct control, therefore, a lag in the acceleration of the power turbine does not retard the fuel supply control, and the generator shaft speed $N_{gg}$ and the power turbine shaft speed $N_{pt}$ are both increased quickly and stably to the desired speed.

When the power turbine shaft speed $N_{pt}$ reaches a target speed $N_{ptset}$, the difference in speed between them becomes small, and therefore the signal level from the calculation unit 25 becomes small in a short time. The moment the signal level from the calculation unit 25 becomes smaller than that from the control signal generator 22 (at $T_3$), the comparator 26 outputs a signal to the first selector 28 to switch from the signal from the function generator 22 to the signal from the calculation unit 25, and thus the fuel supply signal from the calculation unit 25 is applied to the fuel control valve 16 in order to control the turbine system under feedback, or closed-loop control.

Once feedback control has been started, the power turbine shaft speed $N_{pt}$ converges to a target speed $N_{ptset}$ quickly in accordance with the characteristics of the control system while oscillating above and below the target speed $N_{ptset}$.

Figure 5:
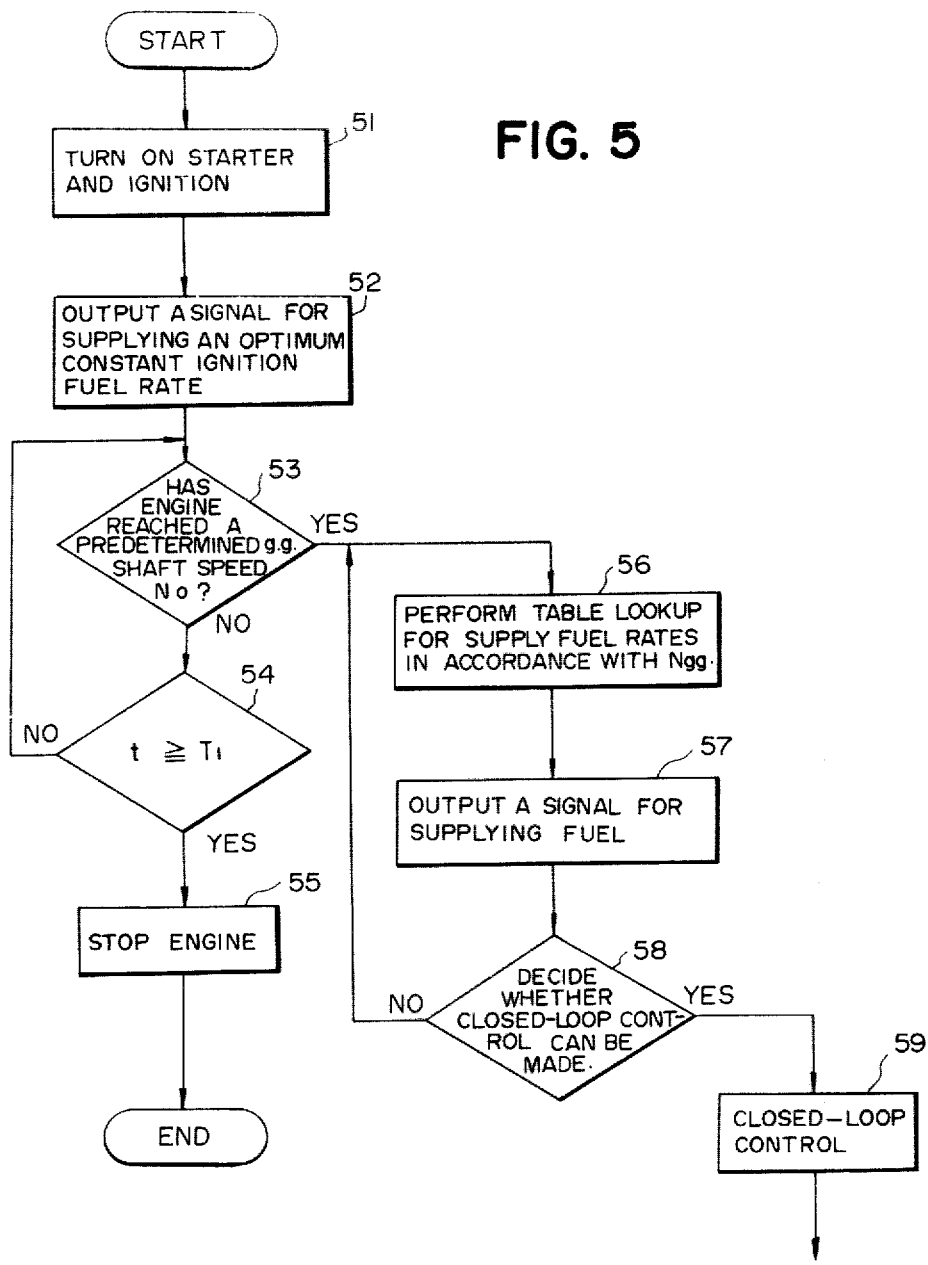
FIG. 5 is a flowchart of the operation of the fuel control system of the present invention when implemented by a microcomputer.

By referring to FIG. 5, the operation of the control system when a microcomputer is utilized will now be explained. In this flowchart, first the gas turbine engine is started and the ignition is turned on (block 51). A signal for giving a constant ignition fuel supply rate is applied to the fuel control valve 16 and the gas turbine engine is started with this fuel rate (at block 52). After starting, the gas generator shaft speed increases and the computer decides on whether the gas generator turbine reaches a predetermined gas generator shaft speed $N_0$ (at block 53). In this case, if the time t necessary for the gas generator shaft to reach a predetermined speed $N_0$ is greater than a predetermined time interval $T_1$ (at block 54), the turbine system is stopped immediately because there may be some problem (at block 55). When the gas generator shaft speed Ngg reaches the predetermined speed $N_0$ (at block 53), the program goes to the block 56. At the block 56, the computer performs the table-lookup to obtain a signal which is stored in ROM and represents optimum fuel supply rates based on the gas generator turbine speed Ngg. The signal obtained at the block 56 is applied to the fuel control valve 16 at the block 57. The microcomputer outputs a signal giving the optimum fuel supply rate as a function of the gas generator shaft speed, such as is shown in FIG. 4. At the block 58, the signal obtained by table lookup at the block 56 is compared with the signal proportionally calculated by the computer based on the difference between the actual power turbine speed and the target power turbine speed. If the former signal is smaller than the latter signal which is proportional to the speed difference signal, the program goes back to the block 56, and if not, the program goes to the block 59 and closed-loop control begins. Under the closed-loop control, the microcomputer outputs a signal which is obtained by proportional-integral (PI) disposition of the speed difference signal and is sent out to the fuel control valve 16.

As particularly described hereinabove, since the gas turbine control system of the present invention can control a gas turbine directly according to a predetermined fuel supply function so that optimum ignition fuel rates can be supplied to the turbine in accordance with the gas generator shaft speed, the turbine will be accelerated quickly immediately after starting, and will reach a target turbine speed stably, with the result that it is possible to reduce the time necessary for starting.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A gas turbine control system for a two-shaft gas turbine having a compressor turbine and a power turbine, which comprises:
   (a) a fuel control valve for controlling the rates of fuel supplied into a combustion chamber of said two-shaft gas turbine, said fuel control valve being controlled by electric signals;
   (b) a control signal generator for outputting signals for supplying an optimum fuel supply rate to said fuel control valve as a function of the gas generator shaft speed of the compressor turbine;
   (c) a power turbine differential speed detector for determining the power turbine speed and for outputting differential speed signals between the actual speed and a target speed of the power turbine shaft;
   (d) a calculation unit for outputting a signal for giving an appropriate fuel supply rate to said fuel control valve after executing arithmetic operations in accordance with the differential speed signals supplied by said power turbine shaft differential speed detector;
   (e) a comparator for outputting a signal to switch from the signal from said control signal generator to the signal from said calculation unit at the moment the signal level of said calculation unit becomes less than that of said control signal generator, the outputs of both said control signal generator and said calculation unit being connected thereto; and
   (f) a first selector for switching from the signal from said control signal generator to that from said calculation unit at the moment said comparator outputs a corresponding signal, the outputs of both said control signal generator and said calculation unit being connected thereto, the output of said first selector being connected to said fuel control valve, whereby the two-shaft gas turbine is first controlled in accordance with optimum ignition fuel supply rates defined by a function stored in said control signal generator and next controlled in accordance with fuel supply rates detected and operated by said power turbine differential speed detector and said calculation unit after the power turbine speed approaches a target power turbine speed.

2. A gas turbine control system for a two-shaft gas turbine as set forth in claim 1, which further comprises:
   (a) an initializer for outputting a signal for giving a constant optimum initial fuel supply rate to said control valve;
   (b) a gas generator shaft speed detector for determining the gas generator shaft speed; and
   (c) a second selector for switching from the signal from said initializer to the signal from said control signal generator at the moment the gas generator shaft speed reaches a predetermined initial speed and said gas generator shaft speed detector outputs a signal to said second selector, the outputs of both said initializer and said control signal generator being connected thereto, the output of said second selector being connected to said comparator and to one terminal of said first selector, whereby the two-shaft gas turbine is first controlled in accordance with a constant optimum initial ignition fuel supply rate stored in said initializer, and next controlled in accordance with optimum ignition fuel supply rates defined by a function stored in said control signal generator after the gas generator shaft speed reaches a predetermined initial speed, and lastly controlled in accordance with fuel supply rates detected and operated by said power turbine differential speed detector and said calculation unit after the power turbine speed approaches a target power turbine speed.

3. A gas turbine control system for a two-shaft gas turbine as set forth in claim 1 or 2, wherein said control signal generator includes a function of signals for giving optimum fuel supply rates according to gas generator shaft speeds, the function being stored in a read-only memory, the signals being read by using table look-up instruction.

4. A gas turbine control system for a two-shaft gas turbine as set forth in claim 1 or 2, wherein the two-shaft gas turbine is controlled under direct control conditions before the first signal from said calculation unit is applied to said fuel control valve.

5. A gas turbine control system for a two-shaft gas turbine as set forth in claim 1 or 2, wherein the two-shaft gas turbine is controlled under feedback control conditions after the first signal from said calculation unit is applied to said fuel control valve.

6. A gas turbine control system for a two-shaft gas turbine having a compressor turbine and a power turbine, which comprises:
   (a) a fuel control valve for controlling the rates of fuel supplied into a combustion chamber of said two-shaft gas turbine, said fuel control valve being controlled by electric signals;
   (b) a power turbine differential speed detector for determining the power turbine speed;
   (c) a microcomputer having a read only memory, which includes a program for performing the following steps:
      (1) outputting a signal for supplying an optimum constant ignition fuel rate to said fuel control valve;
      (2) deciding on whether the gas generator turbine reaches a predetermined gas generator shaft speed $N_0$ by using said power turbine differential speed detector;

(3) performing table lookup to obtain a signal stored in the read only memory and representing an optimum fuel supply rates based on the gas generator turbine speed Ngg, only after the gas generator shaft speed Ngg reaches the predetermined speed $N_0$;

(4) outputting a signal obtained by the table lookup to said fuel control valve as a function of the gas generator shaft speed;

(5) comparing the signal obtained by table lookup with the signal proportionally calculated by the computer itself based on the difference between the actual power turbine speed and a target power turbine speed; and (6) outputting a signal for performing closed-loop control, only after the signal obtained by the table lookup is smaller than that calculated by the computer itself, whereby the two-shaft gas turbine is first controlled in accordance with optimum constant ignition fuel supply rates and next controlled in accordance with closed-loop control after the power turbine speed approaches a target power turbine speed.

7. A gas turbine control system for a two-shaft gas turbine as set forth in claim 6, wherein said program further comprises the following steps: outputting a signal to stop the turbine system when the time t necessary for the gas generator shaft to reach a predetermined speed $N_0$ is greater than a predetermined time interval $T_1$.

* * * * *